(12) United States Patent
Ziaylek

(10) Patent No.: US 8,220,764 B2
(45) Date of Patent: Jul. 17, 2012

(54) EXTERNALLY ACTIVATED LOCKING MOUNTING BRACKET APPARATUS FOR HOLDING A TANK IN A VEHICLE SEATBACK

(76) Inventor: Michael P. Ziaylek, Yardley, PA (US)

(*) Notice: Subject to any disclaimer, the term of this patent is extended or adjusted under 35 U.S.C. 154(b) by 652 days.

(21) Appl. No.: 12/321,940

(22) Filed: Jan. 27, 2009

(65) Prior Publication Data

US 2009/0250582 A1    Oct. 8, 2009

Related U.S. Application Data

(60) Provisional application No. 61/072,689, filed on Apr. 2, 2008.

(51) Int. Cl.
  A47K 1/08       (2006.01)
  F16M 11/00     (2006.01)
  A47G 23/02     (2006.01)
  A47G 1/10       (2006.01)
  A47F 5/00       (2006.01)
  A47C 7/62       (2006.01)
  B62B 1/00       (2006.01)
  B60R 7/00       (2006.01)

(52) U.S. Cl. ............ 248/312; 248/311.2; 248/689; 248/154; 248/146; 248/313; 248/316.1; 248/309.1; 297/217.3; 297/188.04; 280/47.26; 280/79.7; 224/275

(58) Field of Classification Search .......... 248/312, 248/311.2, 307, 686, 689, 231.85, 154, 121, 248/146, 145.3, 314, 313, 316.1, 309.1, 312.1; 297/188.11, 217.3, 188.04, 188.5; 280/47.26, 280/79.5, 79.6, 79.7; 224/275
See application file for complete search history.

(56) References Cited

U.S. PATENT DOCUMENTS

| | | | |
|---|---|---|---|
| 1,286,998 | A | 12/1918 | Graff |
| 2,029,051 | A | 1/1936 | Blevins |
| 2,109,821 | A | 3/1938 | Dunica |
| 2,278,232 | A | 3/1942 | Anderson |
| 2,289,701 | A | 7/1942 | Engel et al. |
| 2,431,698 | A | 12/1947 | Lombard |
| 2,615,238 | A | 10/1952 | Highwood |
| 3,224,944 | A | 12/1965 | Davis |
| 3,490,727 | A | 1/1970 | Miller |
| 3,547,391 | A | 12/1970 | Johnson |
| 3,565,384 | A | 2/1971 | Lockwood |
| 3,603,550 | A | 9/1971 | Byrd |
| D222,527 | S | 11/1971 | Ziaylek, Jr. |
| 3,667,714 | A | 6/1972 | Ziayler, Jr. |
| 3,737,133 | A | 6/1973 | Boecker |
| 3,765,635 | A | 10/1973 | Burrell et al. |
| 3,765,636 | A | 10/1973 | Burrell et al. |
| 3,780,972 | A * | 12/1973 | Brodersen .............. 248/313 |

(Continued)

*Primary Examiner* — Terrell McKinnon
*Assistant Examiner* — Christopher Garft
(74) *Attorney, Agent, or Firm* — Sperry, Zoda & Kane

(57) ABSTRACT

A tank holding bracket mechanism positionable within a seat back of an emergency vehicle for holding therein of an air tank usable for emergency breathing situations which is attachable to the back of emergency personnel such as firefighters while sitting on the vehicle seats during transport. The holding bracket includes a pivoting head movable between an opened position allow entry of removal of a tank from the bracket mechanism and a closed position retaining a tank with respect to the bracket mechanism. A locking mechanism is adapted to selectively lock the head in the closed position to prevent release of the tank responsive to certain vehicle parameters, such as disengagement of an emergency brake or movement of the vehicle transmission from the park mode. The locking mechanism can be externally activated manually or electrically such as with a powered solenoid.

16 Claims, 7 Drawing Sheets

U.S. PATENT DOCUMENTS

| | | | |
|---|---|---|---|
| 3,823,907 A * | 7/1974 | Ziaylek, Jr. | 248/313 |
| D237,357 S | 10/1975 | Ziaylek, Jr. | |
| 3,971,591 A | 7/1976 | Ziaylek | |
| D244,392 S | 5/1977 | Montambo | |
| 4,023,761 A | 5/1977 | Molis | |
| D245,929 S | 9/1977 | Montambo | |
| 4,213,592 A | 7/1980 | Lingenfelser | |
| 4,304,383 A | 12/1981 | Huston | |
| D264,935 S | 6/1982 | Ziaylek, Jr. | |
| D265,287 S | 7/1982 | Ziaylek, Jr. | |
| D267,227 S | 12/1982 | Ziaylek, Jr. | |
| 4,379,541 A | 4/1983 | Harkness | |
| 4,505,448 A | 3/1985 | Massie | |
| 4,555,979 A * | 12/1985 | Cetnarowski | 92/85 B |
| 4,586,687 A | 5/1986 | Ziaylek, Jr. | |
| 4,606,521 A | 8/1986 | Williams | |
| 4,624,432 A | 11/1986 | Salacuse | |
| D298,704 S | 11/1988 | Ziaylek, Jr. | |
| 4,848,714 A | 7/1989 | Ziaylek, Jr. et al. | |
| D303,738 S | 10/1989 | Ziaylek, Jr. | |
| 4,905,950 A | 3/1990 | Turner et al. | |
| 4,979,659 A | 12/1990 | Boyd | |
| D314,325 S | 2/1991 | Ziaylek, Jr. et al. | |
| 4,997,157 A | 3/1991 | Sweeny | |
| D319,778 S | 9/1991 | Ziaylek, Jr. | |
| D331,030 S | 11/1992 | Ziaylek et al. | |
| 5,213,392 A * | 5/1993 | Bostrom et al. | 297/188.04 |
| 5,314,233 A | 5/1994 | Bostrom et al. | |
| D347,735 S | 6/1994 | Ziaylek, Jr. et al. | |
| 5,318,266 A | 6/1994 | Liu | |
| 5,354,029 A | 10/1994 | Ziaylek, Jr. et al. | |
| D352,612 S | 11/1994 | Pond et al. | |
| 5,362,022 A | 11/1994 | McLoughlin et al. | |
| 5,423,508 A | 6/1995 | Isenga et al. | |
| 5,607,133 A | 3/1997 | Markham et al. | |
| 5,681,080 A | 10/1997 | Pond et al. | |
| D390,367 S | 2/1998 | Demski et al. | |
| D394,381 S | 5/1998 | Ziaylek, Jr. et al. | |
| 5,803,544 A | 9/1998 | Block et al. | |
| 5,810,089 A | 9/1998 | Mack | |
| 5,833,195 A | 11/1998 | Haynes | |
| 5,884,948 A * | 3/1999 | Weinerman et al. | 292/216 |
| 5,906,302 A | 5/1999 | Spergel | |
| 5,934,749 A | 8/1999 | Pond et al. | |
| 5,975,475 A | 11/1999 | Chaplin | |
| D419,317 S | 1/2000 | Pond et al. | |
| D424,414 S | 5/2000 | Ziaylek et al. | |
| 6,086,312 A | 7/2000 | Ziaylek et al. | |
| 6,113,004 A | 9/2000 | Steingass et al. | |
| D434,495 S | 11/2000 | Whalen et al. | |
| 6,168,130 B1 | 1/2001 | Yokogi | |
| 6,220,557 B1 | 4/2001 | Ziaylek et al. | |
| 6,471,260 B1 * | 10/2002 | Weinerman et al. | 292/216 |
| 6,543,736 B2 | 4/2003 | Field | |
| 6,601,923 B2 | 8/2003 | Pond et al. | |
| D480,294 S | 10/2003 | Ziaylek, Jr. et al. | |
| 6,655,745 B2 | 12/2003 | Fohrenkamm et al. | |
| 6,702,242 B1 | 3/2004 | Ziaylek, Jr. et al. | |
| D494,049 S | 8/2004 | Ziaylek et al. | |
| D494,453 S | 8/2004 | Ziaylek et al. | |
| 6,769,659 B1 | 8/2004 | Martello | |
| 6,830,226 B2 | 12/2004 | Field et al. | |
| 6,883,766 B1 | 4/2005 | Ziaylek et al. | |
| 6,926,243 B1 | 8/2005 | Ziaylek et al. | |
| 7,028,962 B1 | 4/2006 | Hostetler | |
| D545,003 S | 6/2007 | Heerdt et al. | |
| D558,566 S | 1/2008 | Ziaylek et al. | |
| D562,116 S | 2/2008 | Ziaylek et al. | |
| 7,448,586 B2 * | 11/2008 | Ziaylek et al. | 248/311.3 |
| 7,963,597 B2 * | 6/2011 | Bostrom et al. | 297/188.04 |
| 8,052,209 B2 * | 11/2011 | Bostrom et al. | 297/188.04 |
| 2003/0038525 A1 | 2/2003 | Pond et al. | |
| 2007/0187414 A1 | 8/2007 | Lackore | |
| 2008/0128464 A1 * | 6/2008 | Gale et al. | 224/570 |
| 2008/0245942 A1 * | 10/2008 | Ziaylek et al. | 248/311.3 |
| 2009/0045657 A1 * | 2/2009 | Bostrom et al. | 297/188.04 |
| 2009/0127416 A1 * | 5/2009 | Ziavlek | 248/231.85 |

\* cited by examiner

EXTERNALLY ACTIVATED LOCKING MOUNTING BRACKET APPARATUS FOR HOLDING A TANK IN A VEHICLE SEATBACK

The present application hereby formally claims priority of currently pending U.S. Provisional Patent Application No. 61/072,689 filed Apr. 2, 2008 on a "Externally Activated Locking Seat Bracket for Self-Contained Breathing Apparatus" filed by inventor Michael P. Ziaylek, the inventor listed herein and said referenced provisional application is hereby formally incorporated by reference as an integral part of the present application.

BACKGROUND OF THE INVENTION

1. Field of the Invention

Whenever emergency personnel are traveling in emergency vehicles such as fire trucks or the like it is often necessary to provide self-contained breathing apparatus including an relatively heavy air tank secured to their body for the purpose of providing an air supply under emergency conditions such as at a fire location. A specific construction needs to be provided for the back of the seat in such vehicles such that the personnel can be firmly held in place by a seat belt and shoulder harness in a conventional manner in a seat while providing room for the tank to be held within the seat back. Secure locking of a heavy air tank in place in the mounting bracket of the seat back is an important consideration. The present invention provides a unique means for facilitating locking and unlocking of an air tank with respect to a mounting bracket when positioned on the back of a user or ready to be positioned on the back of a user within a tank receiving zone defined in the overall seat configuration of an emergency vehicle. A safety locking mechanism is included which will assure that the tank is locked to the mounting bracket securely unless the vehicle parking brake is engaged or unless the vehicle transmission is in the Park position or responsive to other desired parameters. With this added level of safety, it can be assured that the vehicle will be stationary at all times when the air tank is disengaged from the mounting bracket. Such heavy tanks can become dangerous moving objects within a vehicle unless they are firmly secured whenever the vehicle is moving for any reason and especially if the vehicle is involved in a motor vehicle accident.

2. Description of the Prior Art

A number of prior art locking devices have been utilized to secure air tanks to seat backs for various purposes such as shown in U.S. Pat. No. 2,431,698 patented Dec. 2, 1947 to H. Lombard on a "Removable Mounting Installation"; and U.S. Pat. No. 2,615,238 patented Oct. 28, 1952 to W. Highwood on a "Tank Clamp Support Holder"; and U.S. Pat. No. 3,194,529 patented Jul. 13, 1865 to G. R. Brock and assigned to Sterling Precision Corporation; and U.S. Pat. No. 3,547,391 patented Dec. 15, 1970 to D. E. Johnson on a "Quick Release Support For Rescue Breathing Apparatus"; and U.S. Pat. No. 3,565, 384 patented Feb. 23, 1971 to L. A. Lockwood and assigned to Bemzomatic Corporation on a "Bracket For Holding And Clamping Gas Cylinder Type Fire Extinguisher Tanks"; and U.S. Pat. No. 3,603,550 patented Sep. 7, 1971 to C. D. Byrd and assigned to Lacy J. Miller Machine Company, Inc. on a "Quick Release Support"; and U.S. Pat. No. 3,667,714 patented Jun. 6, 1972 to T. Ziaylek, Jr. on a "Tank Support"; and U.S. Pat. No. 3,780,972 patented Dec. 25, 1973 to J. C. Brodersen on a "Mounting Apparatus For Gas Containers"; and U.S. Pat. No. 3,823,907 patented Jul. 16, 1974 to T. Ziaylek, Jr. on a "Positive Locking Device"; and U.S. Pat. No. 3,971,591 patented Jul. 27, 1976 to J. Ziaylek and assigned to Ziamatic Corporation on a "Quick-Seat"; and U.S. Pat. No. 4,213,592 patented Jul. 22, 1980 to D. J. Lingenfelser and assigned to Caterpillar Tractor Co. on a "Bracket Assembly For Mounting Fire Extinguishers Thereon"; and U.S. Pat. No. 4,379,541 patented Apr. 12, 1983 to D. M. Harkness on a "Holder For A Container"; and U.S. Pat. No. 4,505,448 patented Mar. 19, 1985 to C. P. Massie on a "Bracket For Fire Extinguishers"; and U.S. Pat. No. 4,586,687 patented May 6, 1986 to T. Ziaylek, Jr. on an "Air Tank Support Of The Quick Release Type"; and U.S. Pat. No. 4,848,714 patented Jul. 18, 1989 to T. Ziaylek, Jr. et al on a "Mounting Plate With Rollers"; and U.S. Pat. No. 5,213,392 patented May 25, 1993 to J. M. Bostrom et al on a "Seat Construction"; and U.S. Pat. No. 5,314,233 patented May 24, 1994 to J. M. Bostrom et al on a "Seat Construction Having A Mechanism For Storing A Tank"; and U.S. Pat. No. 5,681,080 patented Oct. 28, 1997 to G. M. Pond et al and assigned to Seats, Inc. on a "Vehicle Seat For Person Wearing Self-Contained Breathing Apparatus"; and U.S. Pat. No. 5,803,544 patented to W. R. Block et al on Sep. 8, 1998 and assigned to H. O. Bostrom Company, Inc. on a "Seat Construction With Removable Side Cushions"; and U.S. Pat. No. 5,934,749 patented Aug. 10, 1999 to G. M. Pond et al and assigned to Seats, Inc. on a "Vehicle Seat With Removable Bolsters And pivoting Headrest Members"; and U.S. Pat. No. 5,975,475 patented Nov. 2, 1999 to G. S. Chaplin on a "Fire Extinguisher Holder"; and U.S. Pat. No. 6,086, 312 patented Jul. 11, 2000 to M. P. Ziaylek et al on a "Tank Handling Apparatus"; and U.S. Pat. No. 6,220,557 patented Apr. 24, 2001 to M. P. Ziaylek et al and assigned to Michael P. Ziaylek, Theodore Ziaylek, Jr. and Theodore P. Ziaylek on a "Mounting Bracket Means For Detachably Supporting A Generally Cylindrically-Shaped Member Upon A Wall Structure"; and U.S. Pat. No. 6,543,736 patented Apr. 8, 2003 to B. J. Field and assigned to Pacific Safety Products Inc. on a "Quick Release Supporting Apparatus For A Canister"; and U.S. Pat. No. 6,601,923 patented Aug. 5, 2003 to G. Pond et al and assigned to Seats Incorporated on an "Emergency Vehicle Seat With Integrated Seat Belt"; and U.S. Pat. No. 6,655,745 patented Dec. 2, 2003 to J. A. Fohrenkamm et al and assigned to H. O. Bostrom Company, Inc. on an "Emergency Vehicle Seat With Integrated Seat Belt"; and U.S. Pat. No. 6,702,242 patented Mar. 9, 2004 to T. Ziaylek, Jr. et al on a "Releasable Tank Holding Assembly Securable To A Hollow Seat Back To Facilitate Detachable Securement Of A Tank Thereinto"; and U.S. Pat. No. 6,769,659 patented Aug. 3, 2004 to G. A. Martello on a "Bottle Bracket"; and U.S. Pat. No. 6,830,226 patented Dec. 14, 2004 to B. J. Field and assigned to Pacific Safety Products Inc. on a "Quick Release Supporting Apparatus For A Canister"; and U.S. Pat. No. 6,883,766 patented Apr. 26, 2005 to M. P. Ziaylek et al on a "Quick Release Mechanical Bracket"; and U.S. Pat. No. 6,926,243 patented Aug. 9, 2005 to M. P. Ziaylek et al on a "Mounting Bracket With An Ejection Means For Detachable Retaining Of A Cylindrical Tank Member"; and United States Publication No. US 2003/0038525 A1 published Feb. 27, 2003 to G. Pond et al and assigned to Seats, Inc. on an "Emergency Vehicle Seat With Integrated Seat Belt"; and U.S. Design Pat. No. D222,527 patented Nov. 2, 1971 to T. Ziaylek, Jr. on a "Bracket For Use With Lifesaving Equipment"; and U.S. Design Pat. No. D237,357 patented to T. Ziaylek, Jr. and assigned to Ziamatic Corporation on Oct. 28, 1975 on a "Tank Support Bracket For Lifesaving Equipment"; and U.S. Design Pat. No. D245,929 patented Sep. 27, 1977 to R. J U. Montambo and assigned to The Ansul Company on a "Fire Extinguisher Bracket"; and U.S. Design Pat. No. D264,935 patented Jun. 15, 1982 to T. Ziaylek, Jr. and assigned to Ziamatic Corporation on a "Combined Support And Display Bracket For A Self-Contained Breathing Apparatus"; and U.S. Design Pat. No. D265,287 patented Jul. 6, 1982 to T. Ziaylek, Jr. on a "Support Bracket For Biomarine Breathing Apparatus"; and U.S. Design Pat. No. D267,227 patented Dec. 14, 1982 to T. Ziaylek, Jr. and assigned to Ziamatic Corporation on a "Support Bracket For A Gas Cylinder"; and U.S. Design Pat. No. D298,704 patented Nov. 29, 1988 to T. Ziaylek, Jr. on a "Seat For Use Primarily In Emergency Vehicles"; and U.S. Design Pat. No. D303,738 patented Oct. 3, 1989 to T. Ziaylek, Jr. on a "Rotatable Cylinder Holder"; and U.S. Design Pat. No. D314,325 patented Feb. 5, 1991 to T. Ziaylek, Jr. et al on a "Clamping Set Of Bracket Arms For Supporting Tubular Objects"; and U.S. Design Pat. No. D319,778 patented Sep. 10, 1991 to T. Ziaylek, Jr. on a "Vertical Support Brace Bracket Panel For Holding Tubular Objects"; and U.S. Design Pat. No. D347,735 patented Jun. 14, 1994 to T. Ziaylek, Jr. et al on a "Quick Release Support Tank Bracket"; and U.S. Design Pat. No. D390,367 patented Feb. 10, 1998 to R. F. Demski et al and assigned to Seats, Inc. and Pierce Manufacturing Inc. on a "Vehicle Seat"; and U.S. Design Pat. No. D394,381 patented May 19, 1998 to T. Ziaylek, Jr. et al on a "Tank Bracket"; and U.S. Design Pat. No. D419,317 patented Jan. 25, 2000 to G. M. Pond et al and assigned to Seats, Inc. on a "Seat"; and U.S. Design Pat. No. D424,414 patented May 9, 2000 to M. P. Ziaylek et al and assigned to Michael P. Ziaylek, Theodore Ziaylek, Jr. and Theodore P. Ziaylek on an "Adjustable Mounting Bracket For A Cylindrical Member"; and U.S. Design Pat. No. D434,495 patented Nov. 228, 2000 to L. J. Whalen et al and assigned to Wheeled Coach Industries, Inc. on an "Oxygen Bottle Holder"; and U.S. Design Pat. No. D480,294 patented Oct. 7, 2003 to T. Ziaylek, Jr. et al on a "Releasable Tank Holding Assembly"; and U.S. Design Pat. No. D494,049 patented Aug. 10, 2004 to M. P. Ziaylek et al on a "Mounting Bracket With Ejection Mechanism For Holding A Cylindrical Tank"; and U.S. Design Pat. No. D494,453 patented Aug. 17, 2004 to M. P. Ziaylek et al on a "Mechanical Locking Bracket For Holding Cylinders".

SUMMARY OF THE INVENTION

The present invention provides an externally activated locking mounting bracket apparatus for holding a tank in a vehicle seatback which includes a bracket attachable within a vehicle seatback and defining a tank receiving zone means therewithin for selectively receiving and retaining of a tank therewithin.

A pivoting head is included pivotally mounted with respect to the bracket at a position adjacent the tank receiving zone and movable between a closed position for retaining of the tank within the tank receiving zone and an opened position for allowing a tank to be placed within and/or removed from the tank receiving zone. A head spring device is preferably operatively attached to the bracket and to the pivoting head for urging of the pivoting head from the open position into the closed position.

A locking mechanism is also included attached to the bracket which is movable to be selectively engageable with respect to the pivoting head responsive to the pivoting head being in the closed position for locking of the pivoting head in the closed position to prevent movement thereof from the closed position toward the opened position.

The locking mechanism includes in detail a locking cam arm pivotally mounted with respect to the bracket at a position adjacent the pivoting head. The locking cam arm is pivotally movable to a locking position in engagement with the pivoting head while positioned in the closed position to prevent movement thereof from the closed position toward the opened position. The locking cam arm also is movable to a releasing position wherein the locking cam arm is not in engagement with respect to the pivoting head in order to allow movement thereof from the closed position toward the opened position. The locking mechanism further includes a locking cam arm spring operatively attached with respect to the bracket and operatively attached with respect to the locking cam arm for continuously urging thereof toward the locking position as the steady state position thereof. Finally the locking mechanism includes a drive, such an electrical solenoid or the like, operatively attached with respect to the locking cam arm. This drive is responsive to actuation thereof to power movement of the locking cam arm to the releasing position thereof to disengage the locking cam arm from the pivoting head to allow movement of the pivoting head away from the closed position and toward the opened position thereof. The drive is operative responsive to deactivation thereof to power movement of the locking cam arm toward the locking position thereof to be capable of abutment with the pivoting head when positioned in the closed position thereof for facilitating locking of the pivoting head in the closed position.

It is an object of the externally activated locking seat bracket for a self-contained breathing apparatus of the present invention to firmly hold tanks in place to prevent injury to the wearer which could result from a motor vehicle accident while such tanks are not fully secured in position.

It is an object of the externally activated locking seat bracket for a self-contained breathing apparatus of the present invention to firmly secure any air tanks to the seat backs within the vehicle whenever the vehicle is moving.

It is an object of the externally activated locking seat bracket for a self-contained breathing apparatus of the present invention to provide a convenient and quick means for disengagement from the seat.

It is an object of the externally activated locking seat bracket for a self-contained breathing apparatus of the present invention to provide a redundant safety feature including a pivotally moveably head member which can be securely locked in place selectively and be externally controlled such as by monitoring the status of the vehicle parking brake or transmission.

It is an object of the externally activated locking seat bracket for a self-contained breathing apparatus of the present invention which allows the tank to be positioned into the tank holding zone or removed therefrom by physical urging of the body of the tank into abutment with the head bracket.

It is an object of the externally activated locking seat bracket for a self-contained breathing apparatus of the present invention to provide a useful and safe seat back configuration for emergency personnel while confined by a seat belt and/or shoulder harness in an emergency vehicle while wearing an air tank suspended from the person's back.

It is an object of the externally activated locking seat bracket for a self-contained breathing apparatus of the present invention which is safe and convenient to use.

It is an object of the externally activated locking seat bracket for a self-contained breathing apparatus of the present invention which is easily detached from the seat.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
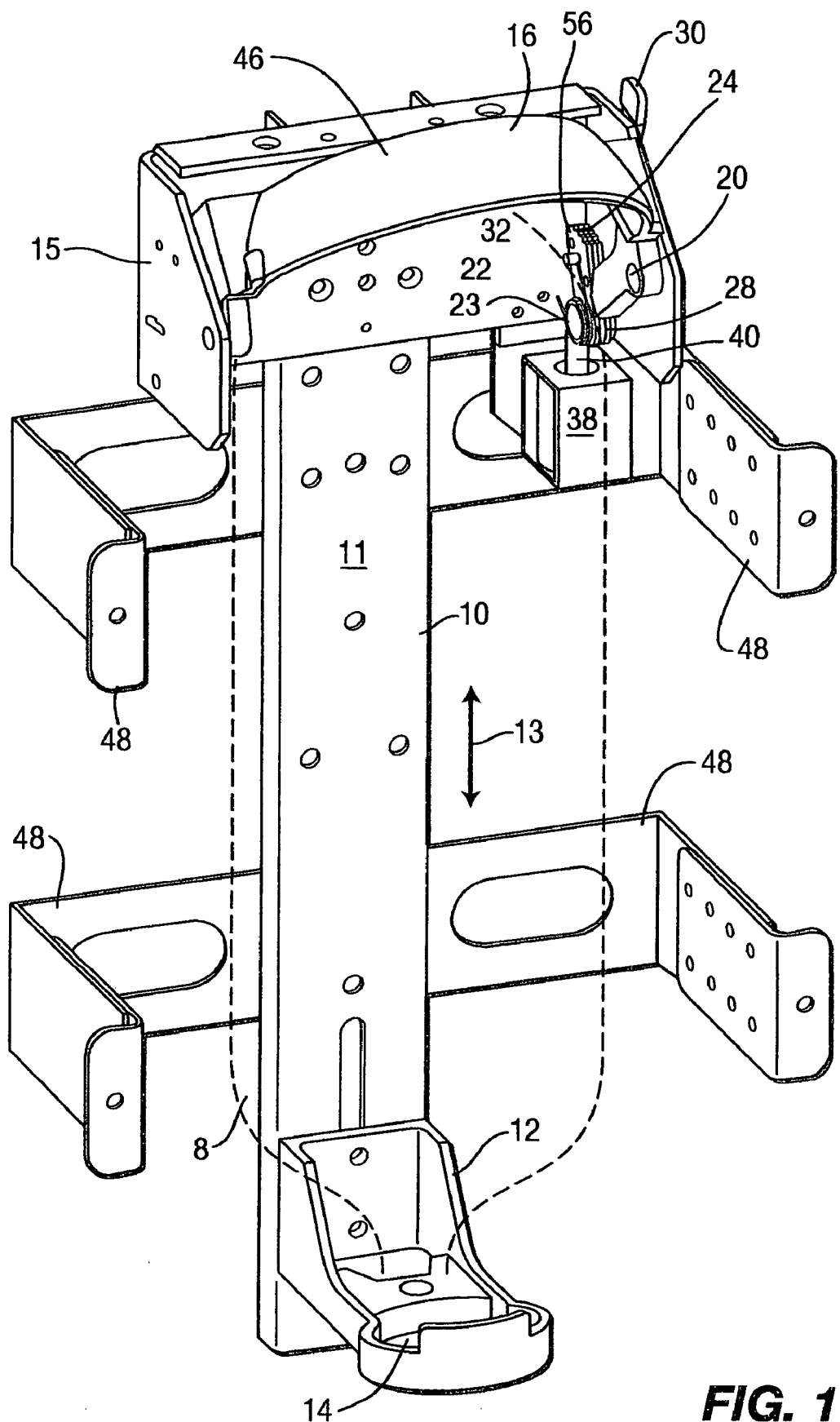
FIG. 1 is a three-quarter front perspective of an externally activated locking self-contained breathing apparatus seat mounting bracket showing the pivoting head in the opened position.

The present invention provides a bracket 10 designed to be positioned within the back of a seat of a vehicle, usually an emergency vehicle, which can hold a tank 8 such as a self-contained breathing apparatus air tank therein conveniently such that it could be quickly donned by an emergency person such as firefighter when sitting in the vehicle as the vehicle reaches the site of the fire emergency. It is important that the tank 8 be securely held in place within the seat back during any movement of the vehicle because such a loose tank could cause injury to passengers in the case of a motor accident or in the case where the tank would become loose within the vehicle even during normal travel. For this purpose a unique locking configuration for holding of a tank holding bracket in the locked position securing retaining the tank with respect to the bracket 10 is provided.

The structure of this embodiment of the bracket includes a main backing plate 11 which extends generally vertically and includes a base 12 defining a base cup 14. A head bracket 15 is positioned in the upper portion of the bracket 10 and includes a rotating or pivoting head 16 designed to move downwardly to a closed position in engagement with the tank when positioned in the tank receiving zone 13 adjacent to the main backing plate 11 and between the pivoting head 16 and the base cup 14. The pivoting head is also movable upward from the closed position to an opened position if desired to facilitate removal of a tank 8 from the tank receiving zone means 13 defined within the bracket 10 or to allow placement of a tank 8 into tank receiving zone 13.

Normally such tanks are cylindrical in shape, rounded on the bottom and rounded in the upper portion and the upper portion includes a protruding head which can vary in basic configuration based on manufacturing design. The head area is usable to facilitate distribution and refilling of the container during usage. The apparatus of the present invention is designed to hold these tanks in an inverted manner such that the top of the tank 8 extends downwardly into the base cup 14 of the base 12 and the bottom portion of the tank extends upwardly such that it can be easily grasped and held in place by the pivoting head 16.

Figure 2:
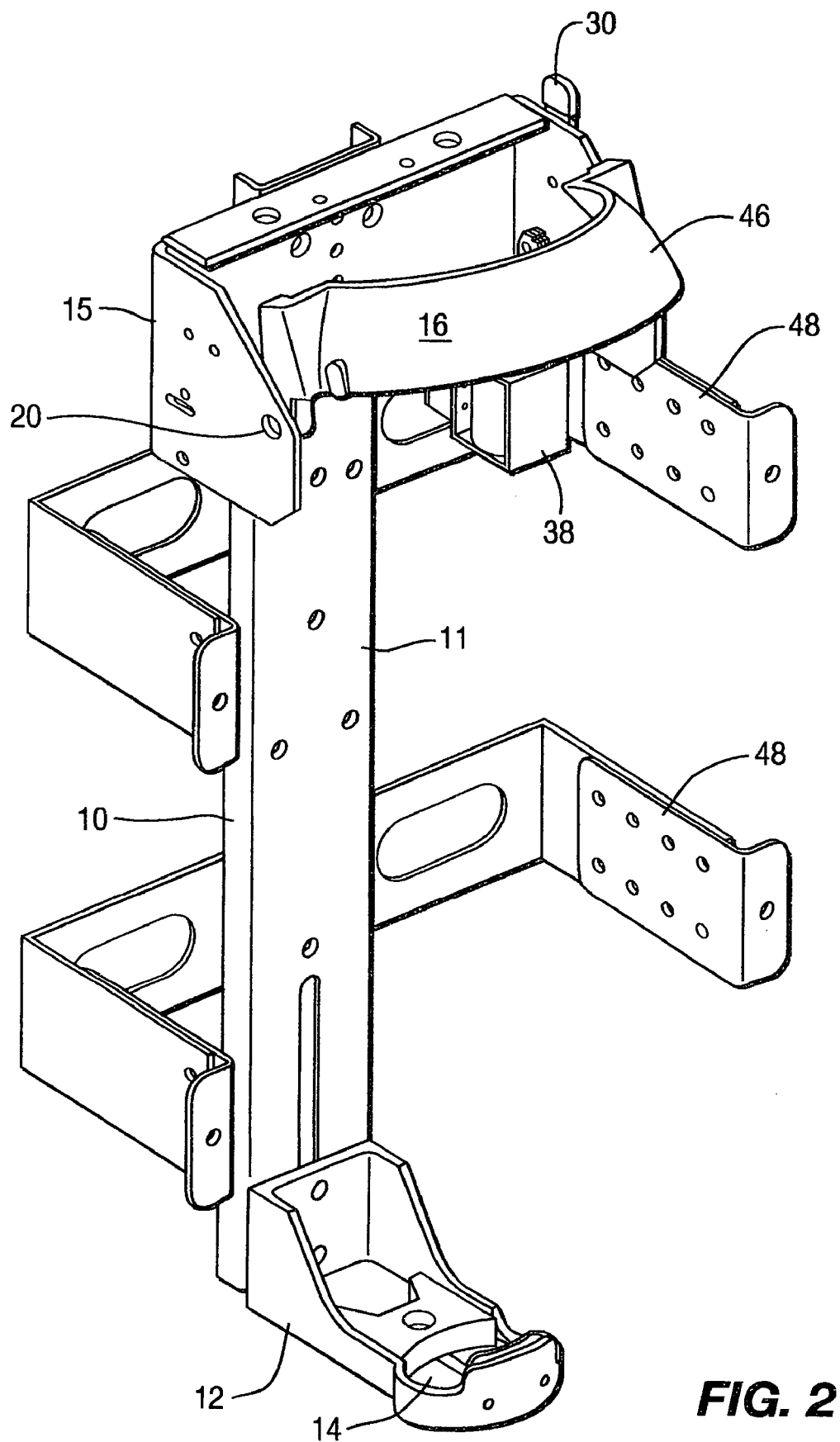
FIG. 2 is a top three-quarter perspective of the configuration shown in FIG. 1 with the pivoting head in the closed position.
Figure 3:
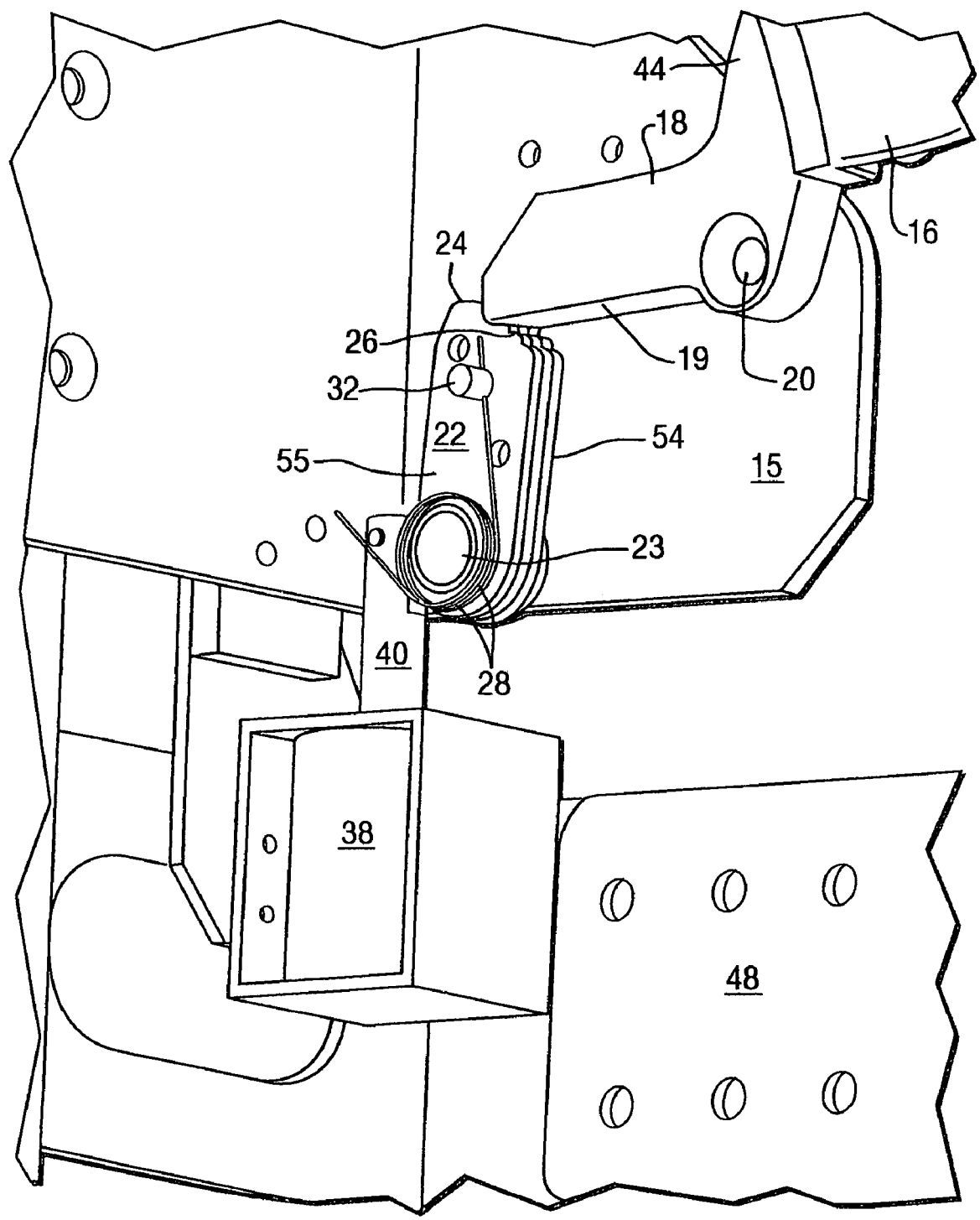
FIG. 3 is an exploded view of the apparatus of the present invention showing the locking mechanism of the present invention in the locked position.
Figure 4:
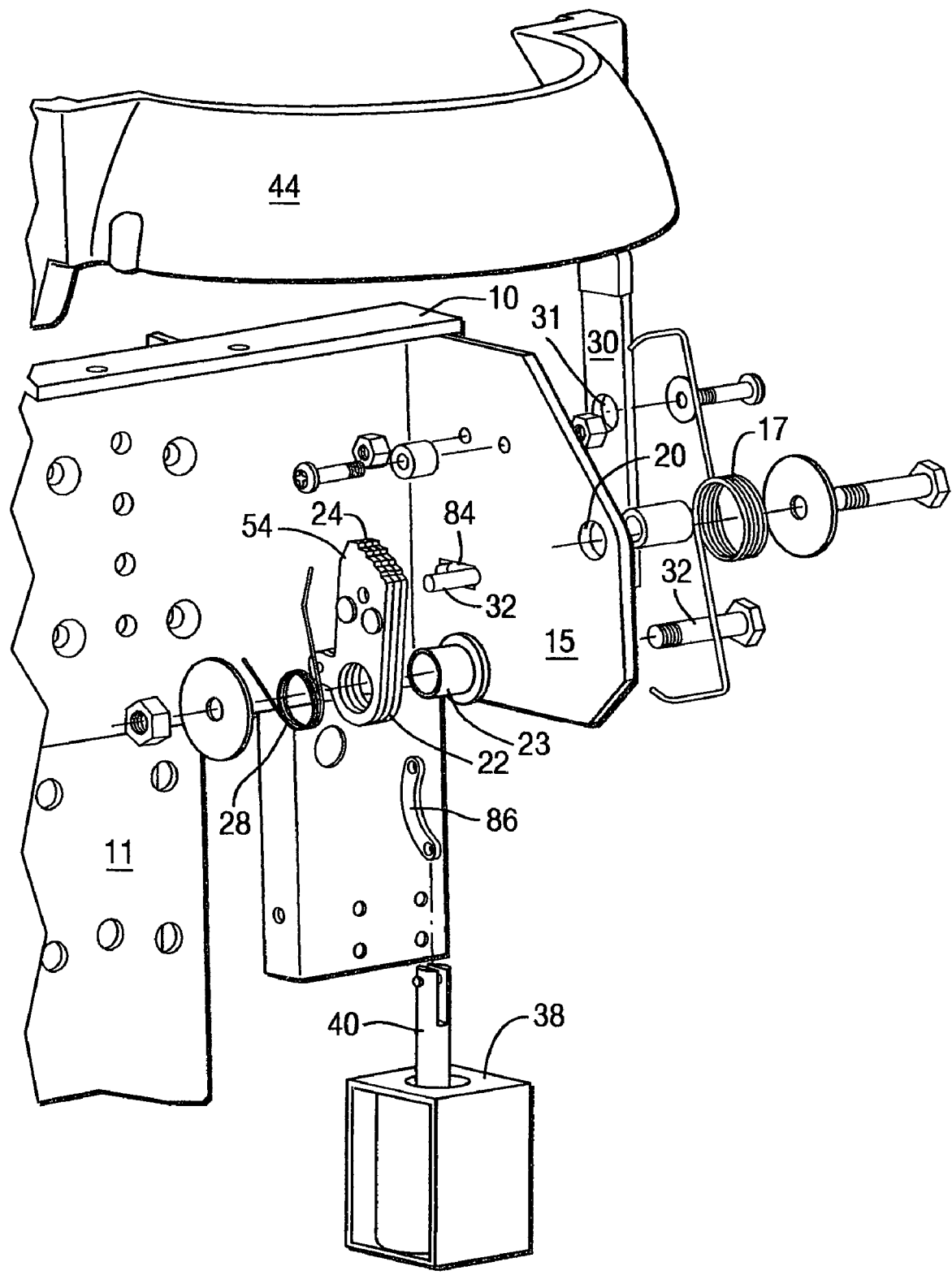
FIG. 4 is an assembly drawing of an alternative embodiment of the apparatus of present invention showing the internal construction of the locking mechanism.
Figure 5:
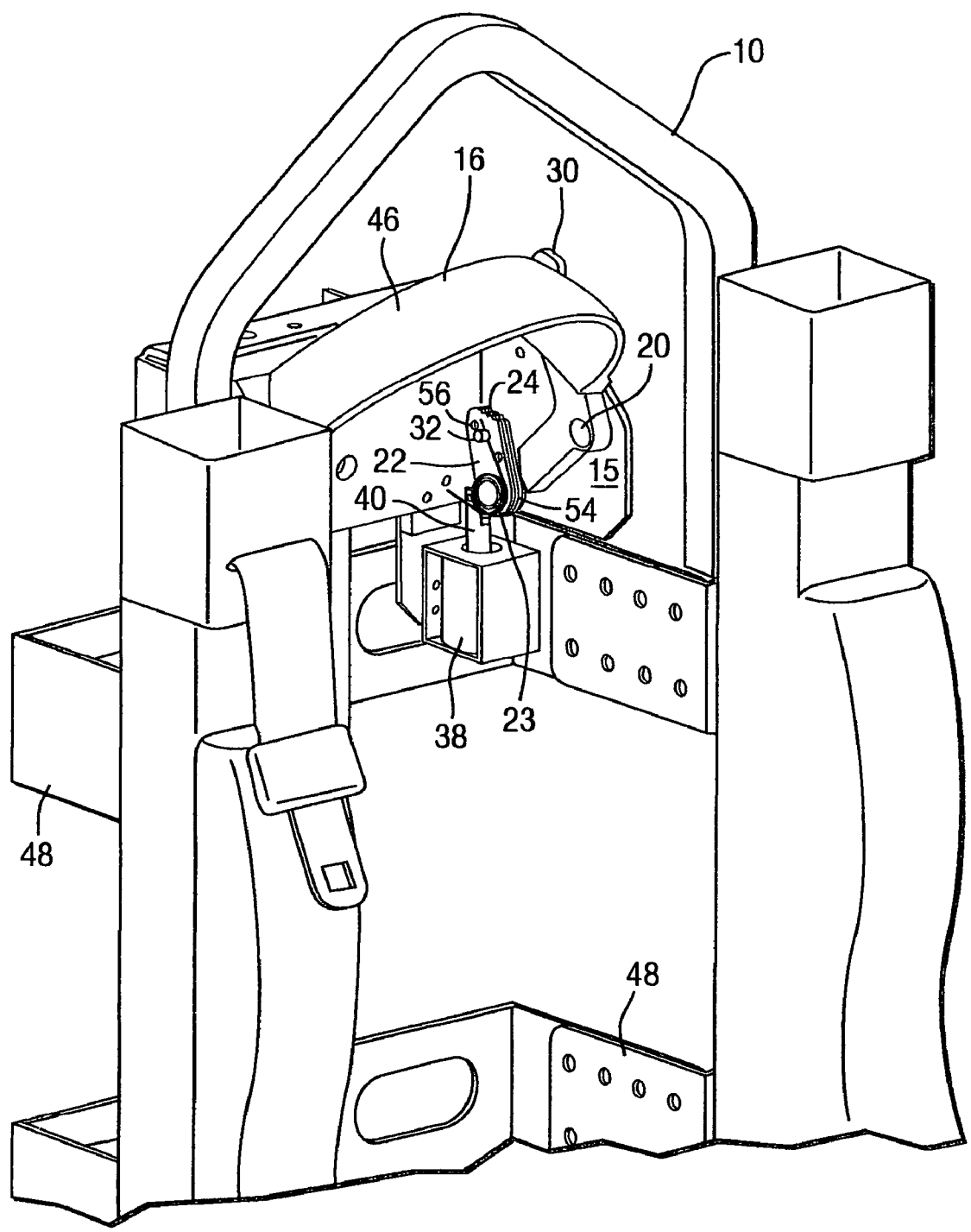
FIG. 5 is a front perspective view of the configuration shown in FIG. 1 in the unlocked position.

With the present invention the pivoting head 16 preferably is maintained in the horizontal orientation and includes a head biasing means such as a head spring means 17 positioned between the head bracket 15 and the pivoting head 16 in such a manner as to continuously bias the head toward the down or closed position as shown best in FIGS. 2, 3 and 4. When it is desired to move a tank 8 into the tank receiving zone 13 initially the head of the tank is placed into the base cup 14. The tank is then rotated upwardly such that the body of the tank 8 impacts the front edge of the rotating or pivoting head 16. This will cause the head means 16 to pivot from the closed head position 44 toward the opened head position 46 as shown best in FIGS. 1 and 5. This movement is caused by the inertia of the tank 8 as it contacts the head 16 causing it to move upwardly slightly in order to allow the tank 8 to pass thereunder into the tank receiving zone 13. As soon as the tank 8 has passed thereunder the head 16 will pivot again downwardly due to the steady state pressure exerted by the head spring means 17 in such a manner as to surround the upwardly extending bottom end of tank 8 and thereby retain it in the tank receiving zone means 13.

One of the unique aspects of the present invention is in the inclusion of a novel locking mechanism 54 for selectively locking of the pivoting head 16 in the closed head position 44 as shown in FIGS. 2,3 and 4. The actuation of this locking mechanism will prevent the head 16 from rotating away from the closed head position 44 toward the opened head position 46 when removal of a tank 8 from the tank receiving zone 13 is undesirable such as when the emergency vehicle is traveling to the location of an emergency.

This locking system is powered to unlock by a locking solenoid 38 which is preferably electrically powered includes an output rod 40 extending outwardly therefrom. Solenoid 38 is powered by electrical power lines 42 extending therefrom which can be connected to various portions of the vehicle to facilitate control. One of the most advantageous orientations is to connect the power lines 42 of locking solenoid 38 with respect to the parking brake switch of a vehicle. Whenever the parking brake switch is in the on position the solenoid 38 will be allow the locking cam arm means to move to the releasing position to allow removal of tank 8. However, whenever the parking brake is disengaged the solenoid 38 will de-activate allow the biasing force of the locking can arm spring means 28 to move to the locking position in engagement with the pivoting head means 16 to prevent movement thereof from the closed head position 44 to the opened head position 46. Thus, the solenoid be de-activated to allow the head spring 17 to prevent movement of the pivoting head 16 to the opened head position 46 unless the parking brake switch is on. Thus, the tank 8 will be fixedly secured within the tank receiving zone 13 until the operator of the vehicle moves the parking brake switch to the on position. This is a safety arrangement which prevents unlocking of the secure holding of the tank 8 by the bracket means 10 unless the vehicle is in a stationary position with the parking brake on. Control of operation of the solenoid 38 can be provided by sensing other parameters of vehicle operation that will also assure safe retaining of any tanks 8 within the vehicle such as being only responsive to a vehicle automatic transmission being in the park position to allow the pivoting head 16 to move to the opened head position 46.

The pivoting head means 16 defines a head locking arm 18 thereon which extends outwardly therefrom to facilitate engagement thereof with respect to the locking cam arm 22 of the locking mechanism 54. Head locking arm 18 preferably includes a hardened insert 19 preferably of tempered steel to resist wear which is adapted to be engaged by pivotal movement of a locking cam arm 22. Locking cam arm 22 is pivotally mounted about a locking cam arm pivot 23 and defines a locking cam surface 24 thereon. Locking cam arm 22 which is pivotally mounted about the locking cam arm pivot point 23 is adapted to be operatively connected by linkage to the powered movement of solenoid rod 40. As such, when the solenoid rod 40 moves upwardly responsive to de-activation of the locking solenoid 38, the locking arm cam 22 will be allow to pivot toward the head locking arm causing the locking cam surface 24 to engage the head locking arm 18 of the pivoting head 16 due to the force of the locking cam arm spring means 28 which urges the locking cam arm 22 into engagement with the hardened insert 19 of the head locking arm 18 of the pivoting head means 16 thereby allow locking of the pivoting head 16 in the closed head position 44. The locking cam arm means defines a locking cam surface 24 having a plurality of engagement teeth 26 defined thereon the to facilitate engagement thereof with respect to the hardened insert 19 of the head locking arm 18.

When the solenoid is actuated the output rod 40 be drawn downwardly to cause the locking cam arm 22 to moves to the releasing position 56 and the locking cam surface 24 will disengage from the hardened insert 19 of the head locking arm 18 thereby forcing the locking cam arm means 22 to move to the releasing position 55 out of engagement with respect to the pivoting head means 16 such that the pivoting head 16 will be capable of movement from the closed head position 44 to the opened head position 46 to allow a tank 8 to enter the tank receiving zone 13 or exit therefrom as desired.

A locking cam arm spring 28 is operatively connected to the locking cam arm 22 to urge it to move toward the locking position 55 such that the cam surface 24 thereof is in engagement with respect to the head locking arm 18. As such, opening of the head locking arm 18 to the opened head position 46 will be prevented unless the locking solenoid 38 overcomes the resiliently exerted bias of the locking cam arm spring means 28 to cause locking cam arm 22 to move to the releasing position 56 thereof. Thus, unless the vehicle parking brake switch is in the on position such that the parking brake is engaged, it will be impossible for a tank 8 to be capable of being removed from the tank receiving zone 13. Thus, such removal is prevented unless the vehicle has come to a stop and the parking brake has been properly engaged. An alternative configuration might be utilized to sense that the vehicle transmission has been placed into the park position. Other similar safeguarding parameters can be sensed to provide information to the locking solenoid 38 that it is now safe to allow tanks 8 to be removed from the tank receiving zones 13 of the seat backs within the vehicle.

In the preferred configuration of the present invention as shown, the pivoting head 16 is pivotally mounted about a head pivot 20 which extends through the head bracket 15 of the main bracket 10. Similarly the locking cam 22 is pivotally about a locking cam pivot 23 also defined in the head bracket 15 of main bracket 10.

Another failsafe mechanism included in the present invention is the resiliently biased top clamp 36. This top clamp extends outwardly and is designed to exert a downwardly directed bias on the bottom of the tank 8 when positioned within the tank receiving zone 13 to further facilitate retaining thereof securely in place safely within the tank receiving zone 13.

It is important with the present invention to provide a means for servicing of the apparatus and for this reason a service arm 30. Service arm 30 is pivotally mounted at a service arm pivot point 31 defined in the head bracket 15 of main bracket 10. Service arm 30 is pivotally movable to control positioning of the locking cam arm means 22 manually. Service arm 30 defines a service arm aperture 52 extending therethrough.

A service arm pin 32 is fixedly mounted in the locking cam arm 22 and extends through a longitudinal slot means 84 defined in the head bracket 15 of the main bracket 10 and further extends into the service arm aperture means 52. As such, movement of the service arm 30 can urge similar movement of the service arm aperture means 52 which while capturing the service arm pin 32 will force pivotal movement of the locking cam arm 22 therewith as desired. For this reason movement of the service arm 30 will cause similar movement of the locking cam arm 22 between the releasing position 56 and the locked position 55. For this reason pivotal movement of the service arm 30 will forcibly cause locking or unlocking of movement of the pivoting head 16 as desired and in this manner provide a means for easily facilitating service of the apparatus of the present invention. The movement of the service arm 30 will also provide a manual backup to the powered drive means 38 for controlling movement of the pivoting head means 16 between the closed head position 44 and the opened head position 46.

An important aspect of the present invention is the inclusion of a plurality of mounting arms 48. These mounting arms 48 provide the means of securing of the bracket 10 of the present invention with respect to the configuration of the vehicle seat. These mounting arms 48 are sometimes provided by the seat manufacturer but also can be provided by the manufacturer of the tank receiving bracket 10 and this construction will vary depending on the configuration and design of the seat and the bracket themselves.

It is important that the apparatus of the present invention be usable with various different configurations of designs for the tank 8 and for this reason an adjustable foot member or base cup 14 is provided which includes an engagement screw which can be selectively tightened at various positions along a slot to vary the lateral dimension of the base cup 14 to accommodate tanks 18 having various different configurations especially different head configurations.

Figure 6:
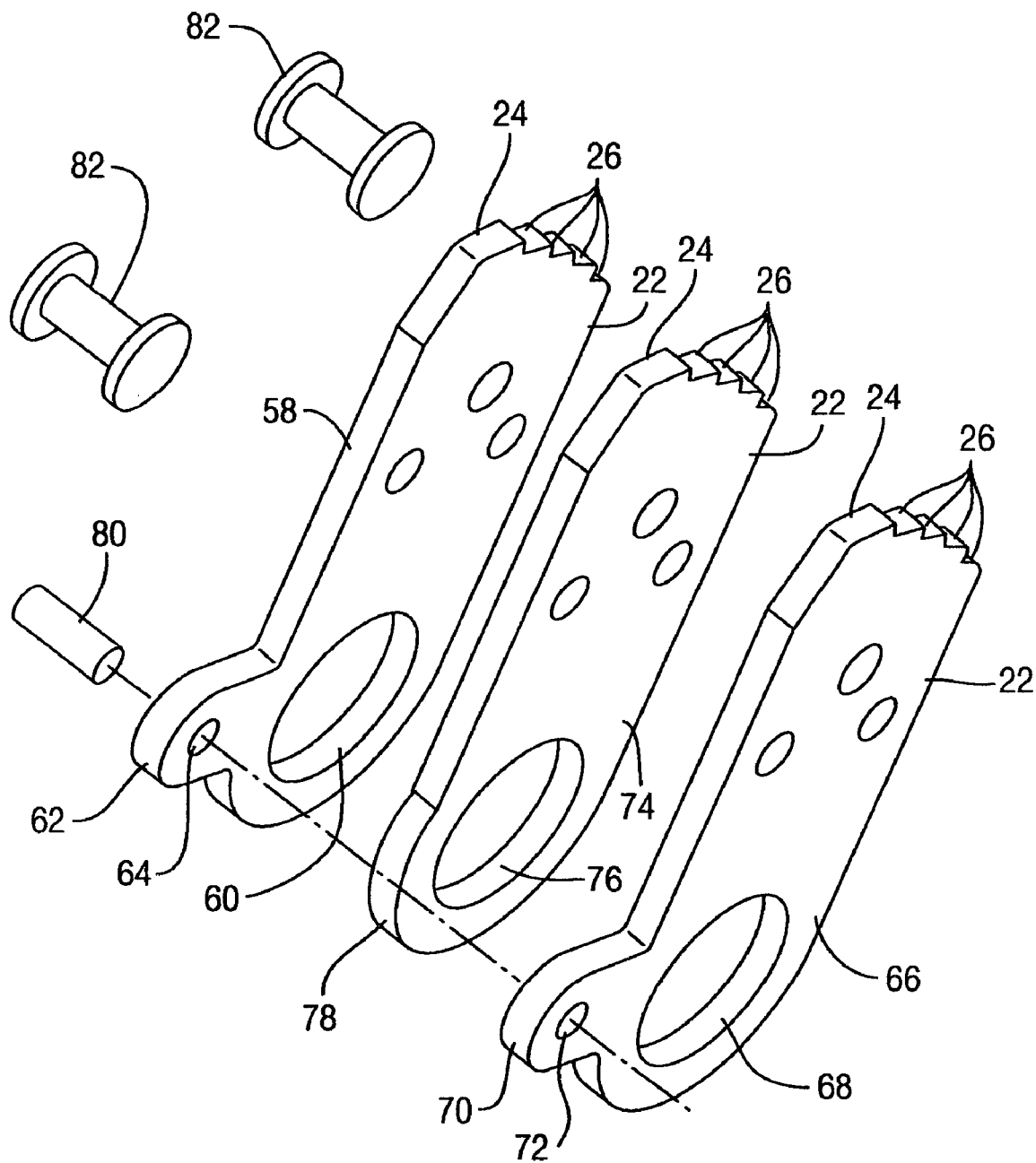
FIG. 6 is a perspective view of the detailed construction of an embodiment of the locking cam arm.
Figure 7:
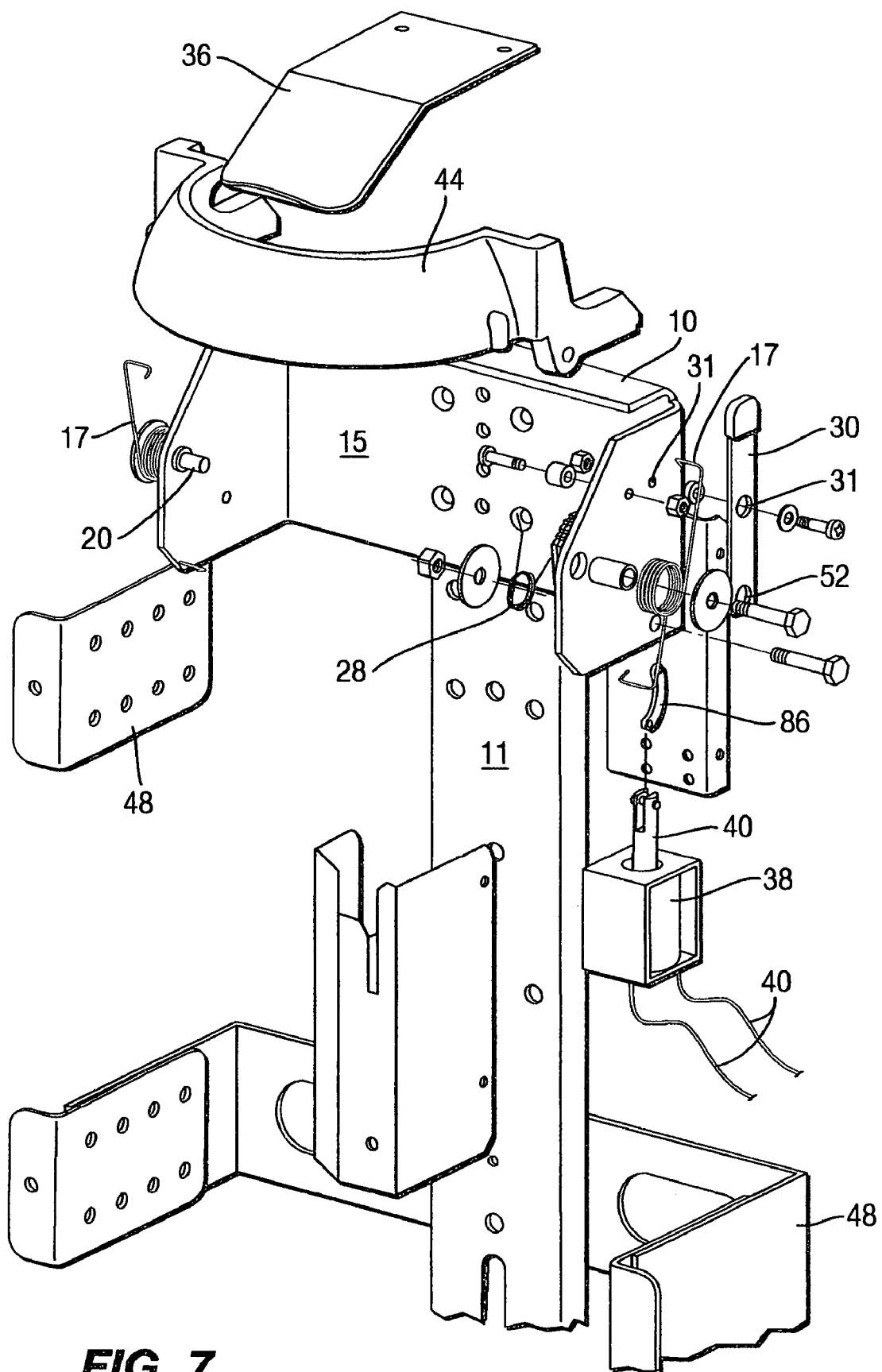
FIG. 7 is an assembly drawing of an alternative embodiment of the apparatus of present invention showing the external construction of the locking mechanism.

One of the unique aspects of the apparatus of the present invention is in the unique construction of the locking cam arm 22. This construction is shown best in FIG. 6 which shows three individual plates in exploded view. These include a first plate means 58 and a second plate means 66 and a third plate means 74. In this construction the first plate means 58 and the second plate means 66 are of identical construction.

In particular the first plate means 58 includes a first plate aperture means 60 defined extending therethrough and a first linkage tab 62 extending laterally outwardly therefrom. A first linkage aperture means 64 is also defined extending through the first plate means 58.

The second plate means 66 is of a construction basically identical to the first plate means 58 with a second plate aperture means 68 defined therein and a second linkage tab 70 extending outwardly therefrom. A second linkage aperture means 72 is also defined therein. The third plate means 74 is constructed identically to the first plate means 58 and the second plate means 66 except for the omission of a linkage tab. That is, the third plate means 74 includes a third plate aperture means 76 defined therein. The overall construction of the locking cam arm 22 of the present invention is achieved by providing a sandwich-type construction with the third plate means 74 in the middle and the first plate means 58 secured on one side thereto and the second plate means 66 secured on the opposite side thereto. These three members are secured together by a plate securement means 82 such as a plurality of rivets. The rivets are adapted to extend through each of the plates 58, 66 and 74 in such a manner as to secure them with respect to one another with the respective plate apertures, that is, namely the first plate aperture means 60, the second plate aperture means 68 and the third plate aperture means 76 in registration with one another to facilitate pivotal mounting of the locking cam arm 22 with respect to the bracket 10. With the three plates secured to one another the first linkage tab 62 and the second linkage tab 70 will be positioned adjacent to one another but slightly spatially disposed from one another by a dimension equal to the thickness of the third plate means 74. In this manner a linkage engagement slot 78 will be defined between the first linkage tab 62 of first plate means 58 and the second linkage tab 70 of the second plate means 66. This linkage engagement slot 78 is adapted to engage an arcuate link 86 in a movable manner. Arcuate link 86 is best shown in FIG. 4 where it extends between the longitudinal slot 84 defined in the locking cam arm 22 and the output rod 40 of drive mean 38. This link provides the interconnection between the output rod 40 of the drive means 38 for powering movement of the locking cam arm 22. This unique construction greatly facilitates assembly and machining of the pairs needed to form the locking cam arm 22. Preferably the first linkage tab 62 and the second linkage tab 70 will define apertures therein with a linkage pin 80 extending therethrough and through the end of the arcuate link 86 positioned therein to facilitate connection therewith. The linkage pin 80 which retains the arcuate link 86 within the linkage engagement slot 78 is positionable extending through the first linkage aperture means 64 defined in first linkage tab 62 and the second linkage aperture means 72 defined in the second linkage tab 70 in such a manner as to also extend through the arcuate link 86 positioned within the linkage engagement slot 78.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. An externally activated locking mounting bracket apparatus for holding a tank in a vehicle seatback comprising:
    A. a bracket attachable within a vehicle seatback and defining a tank receiving zone means therewithin for selectively receiving and retaining of a tank therewithin;
    B. a pivoting head means pivotally mounted with respect to said bracket at a position adjacent said tank receiving zone and movable between a closed position for retaining of a tank within said tank receiving zone means and an opened position for allowing a tank to be placed within and removed from said tank receiving zone means;
    C. a head resilient biasing means operatively attached to said bracket and to said pivoting head means for urging of said pivoting head means from said opened position into said closed position;
    D. a locking mechanism attached to said bracket and being moveable to be selectively engageable with respect to said pivoting head means responsive to said pivoting head means being in the closed position for locking of said pivoting head means in the closed position to prevent movement thereof from the closed position toward the opened position, said locking mechanism comprising:
        (1) a locking cam arm means pivotally mounted with respect to said bracket at a position adjacent said pivoting head means, said locking cam arm means being pivotally moveable to a locking position in engagement with said pivoting head means while positioned in the closed position to prevent movement thereof from the closed position toward the opened position, said locking cam arm means also being movable to a releasing position wherein said locking cam arm means is not in engagement with said pivoting head means in order to allow movement thereof from the closed position toward the opened position, wherein said locking cam arm means further comprises:
            (a) a first plate means defining a first plate aperture means extending therethrough and a first linkage tab extending outwardly laterally therefrom, said first linkage tab defining a first linkage aperture means extending therethrough;
            (b) a second plate means defining a second plate aperture means extending therethrough and a second linkage tab extending outwardly laterally therefrom, said second linkage tab defining a second linkage aperture means extending therethrough; and
            (c) a third plate means defining a third plate aperture means extending therethrough, said first plate means being attached to said third plate means with said first plate aperture means in registration with respect to said third plate aperture means thereof, said second plate means being attached to said third plate means at a position opposite and spatially disposed from said first plate means with said second plate aperture means in registration with respect to said first plate aperture means and said third plate aperture means, said first plate aperture means and said second plate aperture means and said third plate aperture means being in mutual alignment to facilitate pivotal movement of said locking cam arm means with respect to said bracket, said first linkage tab being in alignment with said second linkage tab and spatially disposed therefrom to define a linkage engagement slot therebetween adapted to receive said arcuate link means extending therewithin;
            (d) a linkage pin means extending through said first linkage aperture means into said linkage engagement slot and into engagement with said arcuate link means positioned therewithin and through said second linkage aperture means for moveably securing said arcuate link means with respect to said locking cam arm means;
        (2) a locking cam arm biasing means operatively attached with respect to said bracket and operatively attached with respect to said locking cam arm means for continuously urging thereof toward the locking position as the steady state position thereof; and
        (3) a drive means operatively attached with respect to said locking cam arm means, said drive means comprising an electrically powered solenoid and being responsive to actuation thereof to power movement of said locking cam arm means to said releasing position thereof to disengage said locking cam arm means from said pivoting head means to allow movement of said pivoting head means away from the closed position and toward said opened position thereof, said drive means being operative responsive to deactivation thereof to power movement of said locking cam arm means toward said locking position thereof to be capable of abutment with said pivoting head means when positioned in said closed position thereof for facilitating locking of said pivoting head means in said closed position, said drive means including an output rod extending outwardly away therefrom which is movable responsive to powering of said drive means, said locking mechanism further including an arcuate link means movable attached to said output rod to be movable therewith and movable attached to said locking cam arm means for powering movement thereof responsive to activation of said drive means toward said releasing position thereof.

2. An externally activated locking mounting bracket apparatus for holding a tank in a vehicle seatback as defined in claim 1 wherein said drive means is mounted on said bracket.

3. An externally activated locking mounting bracket apparatus for holding a tank in a vehicle seatback as defined in claim 1 wherein said pivoting head means includes a head locking arm which is adapted to be selectively engaged by said locking cam arm means to facilitate locking of said pivoting head means in said closed position responsive to biasing force exerted thereon by said locking cam arm biasing means whenever said drive means is de-activated.

4. An externally activated locking mounting bracket apparatus for holding a tank in a vehicle seatback as defined in claim 3 wherein said head locking arm includes a hardened insert attached thereto to prevent wear of said head locking arm from repeated abutting contact with said locking cam arm means.

5. An externally activated locking mounting bracket apparatus for holding a tank in a vehicle seatback as defined in claim 4 wherein said hardened insert is made of tempered steel to resist wear thereof.

6. An externally activated locking mounting bracket apparatus for holding a tank in a vehicle seatback as defined in claim 1 wherein said locking cam arm means includes a locking cam surface which is adapted to engage said pivoting head means, said locking cam surface including a plurality of engagement teeth thereon to facilitate engagement thereof with respect to said pivoting head means.

7. An externally activated locking mounting bracket apparatus for holding a tank in a vehicle seatback as defined in claim 1 wherein said locking cam arm means further includes a plate securement means adapted to extend through said first plate means and said second plate means and said third plate means for fixed mutual securement therebetween.

8. An externally activated locking mounting bracket apparatus for holding a tank in a vehicle seatback as defined in claim 7 wherein said plate securement means comprises a rivet securement means.

9. An externally activated locking mounting bracket apparatus for holding a tank in a vehicle seatback as defined in claim 1 wherein said head resilient biasing means comprises a head spring means.

10. An externally activated locking mounting bracket apparatus for holding a tank in a vehicle seatback as defined in claim 1 wherein said locking cam arm biasing means comprises a locking cam arm spring means.

11. An externally activated locking mounting bracket apparatus for holding a tank in a vehicle seatback as defined in claim 1 wherein said bracket further includes a head bracket and a base cup positioned therebelow which are adapted to receive a tank positioned inverted therewithin, said tank receiving zone means extending vertically from said base cup upwardly to said head bracket to receive a tank positioned inverted therewithin.

12. An externally activated locking mounting bracket apparatus for holding a tank in a vehicle seatback as defined in claim 1 wherein said locking mechanism further comprises a service arm pivotally attached with respect to said bracket and operatively connected to said locking cam arm means, said service arm being moveable to urge movement of said locking cam arm means to said releasing position thereof.

13. An externally activated locking mounting bracket apparatus for holding a tank in a vehicle seatback as defined in claim 12 wherein said bracket further defines a longitudinal slot means extending therethrough and further including a service arm pin means attached to said locking cam arm means and extending through said longitudinal slot means into engagement with respect to said service arm to facilitate operative attachment of said service arm with respect to said locking cam arm means.

14. An externally activated locking mounting bracket apparatus for holding a tank in a vehicle seatback as defined in claim 12 wherein said service arm is manually movable for urging movement of said locking cam arm means to said releasing position thereof.

15. An externally activated locking mounting bracket apparatus for holding a tank in a vehicle seatback as defined in claim 12 wherein said service arm is attached with respect to said locking cam arm means with said bracket positioned therebetween to facilitate manual operation of said service arm.

16. An externally activated locking mounting bracket apparatus for holding a tank in a vehicle seatback comprising:

A. a bracket attachable within a vehicle seatback and defining a tank receiving zone means therewithin for selectively receiving and retaining of a tank therewithin, said bracket further including a head bracket and a base cup positioned therebelow which are adapted to receive a tank positioned inverted therewithin, said tank receiving zone means extending vertically from said base cup upwardly to said head bracket to receive a tank positioned inverted therewithin, said bracket further defines a longitudinal slot means extending therethrough;

B. a pivoting head means pivotally mounted with respect to said bracket at a position adjacent said tank receiving zone and movable between a closed position for retaining of a tank within said tank receiving zone means and an opened position for allowing a tank to be placed within and removed from said tank receiving zone means, said pivoting head means including a head locking arm which is adapted to facilitate locking of said pivoting head means in said closed position responsive to a biasing force exerted thereon, said head locking arm includes a hardened insert made of tempered steel attached thereto to prevent wear thereof;

C. a head resilient biasing means comprising a head spring means operatively attached to said bracket and to said pivoting head means for urging of said pivoting head means from said opened position into said closed position;

D. a locking mechanism attached to said bracket and being moveable to be selectively engageable with respect to said pivoting head means responsive to said pivoting head means being in the closed position for locking of said pivoting head means in the closed position to prevent movement thereof from the closed position toward the opened position, said locking mechanism comprising:

(1) a locking cam arm means pivotally mounted with respect to said bracket at a position adjacent said pivoting head means, said locking cam arm means being pivotally moveable to a locking position in engagement with said pivoting head means while positioned in the closed position to prevent movement thereof from the closed position toward the opened position, said locking cam arm means also being movable to a releasing position wherein said locking cam arm means is not in engagement with said pivoting head means in order to allow movement thereof from the closed position toward the opened position, said locking cam arm means including a locking cam surface which is adapted to engage said pivoting head means, said locking cam surface including a plurality of engagement teeth thereon to facilitate engagement thereof with respect to said pivoting head means, said locking cam arm means comprising:
  (a) a first plate means defining a first plate aperture means extending therethrough and a first linkage tab extending outwardly laterally therefrom, said first linkage tab defining a first linkage aperture means extending therethrough;
  (b) a second plate means defining a second plate aperture means extending therethrough and a second linkage tab extending outwardly laterally therefrom, said second linkage tab defining a second linkage aperture means extending therethrough; and
  (c) a third plate means defining a third plate aperture means extending therethrough, said first plate means being attached to said third plate Means with said first plate aperture means in registration with respect to said third plate aperture means thereof, said second plate means being attached to said third plate means at a position opposite and spatially disposed from said first plate means with said second plate aperture means in registration with respect to said first plate aperture means and said third plate aperture means, said first plate aperture means and said second plate aperture means and said third plate aperture means being in mutual alignment to facilitate pivotal movement of said locking cam arm means with respect to said bracket, said first linkage tab being in alignment with said second linkage tab and spatially disposed therefrom to define a linkage engagement slot therebetween adapted to receive said arcuate link means extending therewithin;
  (d) a linkage pin means extending through said first linkage aperture means into said linkage engagement slot and into engagement with said arcuate link means positioned therewithin and through said second linkage aperture means for moveably securing said arcuate link means with respect to said locking cam arm means;
  (e) a plate rivet securement means adapted to extend through said first plate means and said second plate means and said third plate means for fixed mutual securement therebetween;
  (f) a service arm pin means attached to said locking cam arm means and extending through said longitudinal slot means; into engagement with respect to said service arm to facilitate operative attachment of said service arm with respect to said locking cam arm means;
(2) a locking cam arm biasing means comprising a locking cam arm spring means operatively attached with respect to said bracket and operatively attached with respect to said locking cam arm means for continuously urging thereof toward the locking position as the steady state position thereof;
(3) a drive means comprising an electrically powered solenoid operatively attached with respect to said locking cam arm means and mounted on said bracket, said drive means being responsive to actuation thereof to power movement of said locking cam arm means to said releasing position thereof to disengage said locking cam arm means from said pivoting head means to allow movement of said pivoting head means away from the closed position and toward said opened position thereof, said drive means being operative responsive to deactivation thereof to power movement of said locking cam arm means toward said locking position thereof to be capable of abutment with said pivoting head means when positioned in said closed position thereof for facilitating locking of said pivoting head means in said closed position, said head locking arm being adapted to be selectively engaged by said locking cam arm means to facilitate locking of said pivoting head means in said closed position responsive to biasing force exerted thereon by said locking cam arm biasing means whenever said drive means is de-activated, said drive means including an output rod extending outwardly away therefrom which is movable responsive to powering of said drive means, said locking mechanism further including an arcuate link means movable attached to said output rod to be movable therewith and movable attached to said locking cam arm means for powering movement thereof responsive to activation of said drive means toward said releasing position thereof; and
(4) a service arm pivotally attached with respect to said bracket and operatively connected to said locking cam arm means, said service arm being moveable to urge movement of said locking cam arm means to said releasing position thereof, said service arm pin means which is attached to said locking cam arm means and extends through said longitudinal slot means being in engagement with respect to said service arm to facilitate operative attachment of said service arm with respect to said locking cam arm means, said service arm being attached with respect to said locking cam arm means with said bracket means positioned therebetween to facilitate manual operation of said service arm.

* * * * *